United States Patent [19]

Ostermann

[11] Patent Number: 4,533,008

[45] Date of Patent: Aug. 6, 1985

[54] LIVESTOCK SCALE

[76] Inventor: Jerry L. Ostermann, R.R. 2, Sylvan Grove, Kans. 67481

[21] Appl. No.: 586,800

[22] Filed: Mar. 6, 1984

[51] Int. Cl.³ .................. G01G 19/52; G01G 1/18; G01G 21/28; G01G 21/08
[52] U.S. Cl. ................... 177/132; 177/202; 177/244; 177/255; 177/260
[58] Field of Search ........... 177/132, 156, 187, 201, 177/202, 244, 245, 255, 256, 260; 119/155

[56] References Cited

U.S. PATENT DOCUMENTS

| | | |
|---|---|---|
| 148,456 | 3/1874 | Hetfield . |
| 197,489 | 11/1877 | Onslow . |
| 262,373 | 8/1882 | Cole . |
| 446,309 | 2/1891 | West . |
| 988,185 | 3/1911 | Garmon . |
| 1,348,343 | 8/1920 | Zimmerman . |
| 1,424,239 | 8/1922 | Conti . |
| 2,035,982 | 3/1936 | Robinson et al. ............ 177/255 |
| 2,691,231 | 10/1954 | Cook . |
| 2,715,387 | 8/1955 | Marmet . |
| 2,736,549 | 2/1956 | Paul . |
| 2,961,231 | 11/1960 | Kucera . |
| 3,354,974 | 11/1967 | Kintner et al. . |
| 3,599,739 | 8/1971 | Hyer ........................ 177/211 |
| 3,726,353 | 4/1973 | Christensen ............... 177/245 |
| 3,966,000 | 6/1976 | Allen . |
| 4,006,717 | 2/1977 | Hicks . |
| 4,029,163 | 6/1977 | Allen . |
| 4,042,051 | 8/1977 | Ricciardi . |
| 4,138,968 | 2/1979 | Ostermann . |
| 4,280,448 | 7/1981 | Ostermann . |
| 4,286,679 | 9/1981 | Schneider .................. 177/132 |
| 4,470,471 | 9/1984 | Mills ........................ 177/132 |

FOREIGN PATENT DOCUMENTS

| | | | |
|---|---|---|---|
| 46079 | 3/1974 | Australia ................. | 177/132 |
| 41127 | 12/1981 | European Pat. Off. ....... | 177/132 |

Primary Examiner—E. A. Goldberg
Assistant Examiner—Patrick W. Foster
Attorney, Agent, or Firm—Litman, Day and McMahon

[57] ABSTRACT

A livestock scale has a weighing platform supported by a support apparatus and is vertically movable relative thereto. A weighing mechanism is provided and indicates the weight of a load received on the platform. Primary and secondary scale arms are pivotally connected to the support apparatus and the weighing platform by hanging links. A connecting link connects the primary scale arm to the secondary scale arm along a medial segment of the secondary scale arm. A weight indicator is held by the support apparatus and is connected to the primary scale arm for indicating a weight in predetermined proportion to the weight of the load on the platform. Horizontal movement of the weighing platform is restrained by a pair of lateral sway bars and a longitudinal sway link, while vertical deflection of the weighing platform during weighing is not inhibited thereby. The sway link forms a parallelogram configuration with the primary scale arm and the primary hanging link and associated support apparatus. Alternatively, flexible restraints are connected to the structure and the weighing platform for restraining horizontal movement of the platform.

14 Claims, 13 Drawing Figures

LIVESTOCK SCALE

BACKGROUND OF THE INVENTION

This invention relates to livestock scales in general and particularly to such scales having scale arm arrangements and apparatus for limiting horizontal movement of a weighing platform.

It is desirable in raising livestock to routinely determine the weight of the animals. For example, pig litters are routinely weighed to chart weight gains of the entire litter, as when utilizing a system termed "Sow Productivity Indexing". A deviation from a normal weight gain pattern can indicate that at least some of the pigs are not healthy, and appropriate action can be taken if a deviation is noted.

Further, as the animals grow the type of feed is changed at certain stages. Also, by weighing the animals, the owner can select the optimum size at which to send the animals to market for sale.

Various prior devices have been directed to weighing livestock, but have been found to be inefficient or unsatisfactory for weighing litters for various reasons. For example, other types of scales often must be machined to within certain close tolerances. They generally have critical dimensions, typically four, that have to be monitored precisely, with a micrometer, for example. Examples of these scales are the torsion tube type, the knife-edge type, and the torque suspension type. These and other types of scales have generally been found to be difficult to operate and calibrate for accurate measurement. Certain scale arm mechanisms have previously been disclosed, such as U.S. Pat. No. 446,309 issued to West. Although scale arm arrangements are generally preferable to the other types for weighing livestock, previous such arrangements have also generally been shown to be inadequate. For example, the weight-indicator means must necessarily be connected to the scale arms at their central juncture. Thus, there is no room for adjustment to accommodate different weight-indicating means that are set up in a different porportion to the weight received on the weighing platform. Also, there is no provision for precise calibration of the connection of the scale arm and the weight-indicating means after assembly of the scale parts where the parts are not precision made.

It is also generally desirable to manufacture an overall scale apparatus that is relatively small, yet still has large litter capacity, and not bulky to both make the apparatus easier to move about and to reduce the cost. Further, because live and mobile animals are being weighed, it is preferable to provide the apparatus with a restraint system to inhibit horizontal movement of the weighing platform relative to the support apparatus so that animal jostling would not affect the indicated weight or damage the apparatus. It is also desirable to isolate the weighing mechanism from the corrosive excretions of the animals being weighed.

OBJECTS OF THE INVENTION

The principal objects of the present invention are: to provide a livestock scale wherein animals may be weighed; to provide such a scale which accurately weighs the animals; to provide such a scale which can utilize various weight indicating means connected to the scale at various locations; to provide such a scale wherein scale arms of the scale may be machined simultaneously to provide consistency in production; to provide such a scale having a calibration mechanism for adjusting the scale apparatus to accommodate variations in the scale arm arrangement; to provide such a scale which has restraint means that inhibit horizontal movement while allowing vertical deflection of the weighing platform relative to a support apparatus; to provide such a scale which isolates the scale mechanism from corrosive animal excretions; and to provide such a scale which is relatively simple to use, economical to manufacture, and particularly well adapted for the proposed usage thereof.

Other objects and advantages of this invention will become apparent from the following description taken in conjunction with the accompanying drawings wherein are set forth, by way of illustration and example, certain embodiments of this invention.

SUMMARY OF THE INVENTION

A livestock scale is provided for weighing an animal or a litter of animals. The scale includes a weighing platform for receiving the load (i.e. the animals) to be weighed. Preferably the platform is part of or associated with a carriage or basket enclosed or encloseable on the bottom and sides. A surrounding support apparatus supports the platform in a manner such that the platform is vertically movable or deflectable relative to the support apparatus to enable a weighing mechanism to operate. The weighing mechanism indicates the weight of the load received on the platform and includes weight-transmitting means and weight-indicating means.

The weight-transmitting means preferably include a primary scale arm and a secondary scale arm, both having locations that are swingably or pivotally connected to the support apparatus. These connecting locations are horizontally spaced from one another, preferably positioned at opposite ends of the support apparatus.

The primary and secondary scale arms are pivotally connected to the weighing platform by respective hanging links at locations horizontally spaced from the connections of the arms to the support apparatus. A connecting link pivotally connects the secondary scale arm and the primary scale arm at a location spaced from and between the respective primary and secondary hanging links.

Preferably, the locations at which the respective hanging links are attached to their respective scale arms are equally spaced a first distance from the connections of the respective scale arms to the support apparatus. This ensures that a weight transferred to either of the primary and secondary scale arms from the platform, including the load, will register the same on the weighing mechanism whether the weight of the load is shifted such that a majority of such load weight acts on one or the other of the arms or whether it is centered and acts equally on the arms. Thus, the scale is not sensitive to the position of the load within the platform or basket. The force applied to the secondary scale arm is transferred to the primary scale arm through the connecting link. The connecting link is connected to the primary and secondary scale arms at a second distance from the respective connections of the primary and secondary scale arms to the support apparatus. Forces acting on the scale arms are then transferred to the weight-indicating means near a free end of the primary scale arm, which preferably is substantially longer than the secondary scale arm as well as the second distance.

The scale arms function as levers pivoting about the connections of the scale arms to the supporting apparatus. The length of the primary scale arm is maximized, preferably within the confines of the support apparatus, so as to expand the relative lever arm associated with the primary and secondary scale arms. This added length makes the mechanism less sensitive to critical measurements. It is, however, envisioned that the weight-indicating means may be attached to the primary scale arm at any desired point along its length.

A calibration slot and a calibration tab are provided for adjusting the position of the weight-indicating means along the primary scale arm. This allows for fine control of the overall length of the lever arm associated with the scale arms. For example, it has been found that a 10:1 ratio is convenient to use in the system. That is, a load weighing 300 pounds is indicated to weigh 30 pounds on the weight-indicating means, such as a spring scale. To achieve a desired ratio, such as 10:1, a lever arm acting on the weight-indicating means must be ten times longer than a first lever arm associated with the applied load. As illustrated, the primary and secondary hanging links are located a first distance from their respective connections to the support apparatus. With respect to the primary scale arm, this first distance is one-tenth the distance from the connection of the primary scale arm ard to weight-indicating means and the pivotal connection of the primary scale arm to the support apparatus.

In order to achieve a nearly identical lever arm associated with the secondary scale arm and the weight-indicating means, the primary and secondary scale arms are drilled or broached simultaneously, one on top of the other. Thus, the first distance mentioned above is the same for both scale arms, and equal longer relative lever arms are achieved by placing the connecting link at an equal second distance from the respective connections of the primary and secondary scale arms to the support apparatus, such that the added length of the primary arm effectively extends both arms.

When manufacturing the livestock scale, the lengths of the scale arms, with particular reference to the first and second distances, are calculated to correspond to the calibration of the scale. For example, if the first distance was doubled, the lever arm ratio would be reduced to 5:1. The calibration slot is utilized to correct the length of the longer lever arm to account for minor variations in the lengths of the scale arms.

During operation major axes of the primary and secondary arms are aligned so as to form equivalent angles with the imaginary horizontal line passing through the connections of the arms to the support apparatus. Normally the major axes of the arms swing through a plurality of orientations, but are aligned close to horizontal such that movement of the arm produces relatively little horizontal movement in the various links.

As this scale is envisioned to be used for weighing livestock which tend to jostle about it is desirable to provide means to restrain movement of the weighing platform or basket during the weighing operation, such as a linear restraint member. One example of such restraint means comprises a pair of lateral sway bars pivotally connected near respective first ends thereof to the support apparatus and near respective second ends thereof to the weighing platform. One of the pair is positioned in a generally forward lateral orientation, while the other is in a generally backward lateral orientation. These bars limit forward or backward lateral movement of the weighing platform as it undergoes vertical deflection during weighing. The bars do not substantially interfere with the vertical movement, as it is envisioned that only slight, typically less than one inch, vertical movement of the weighing platform is encountered. In the event that greater vertical movement is necessary, the bars may be positioned slightly out of horizontal, such that they do not interfere with the greater vertical movement. Further, the sway bars, may be positioned such that all of the bars extend in the same lateral direction, so that relatively slight lateral movement will not cause twisting of the platform.

In addition to the lateral sway bars, a sway link is provided to inhibit longitudinal horizontal movement of the basket. The sway link is pivotally connected at one end to the support apparatus and at another end to one of the hanging links, such as the primary hanging link. The sway link is positioned so as to form a parallelogram in conjunction with the primary scale arm, primary hanging link and that portion of the support apparatus between the primary scale arm and the sway link. The parallelogram configuration ensures that the basket does not substantially move longitudinally with respect to the support apparatus. Absent the parallelogram configuration the basket may be horizontally deflected, thus possibly contacting the support apparatus and interferring with the weighing accuracy.

In another embodiment, pairs of flexible restraints are used for the restraining means, such as metal straps or bands. Basically a pair of flexible restraints is required for this purpose, wherein each of the pair are aligned in a non-parallel configuration, are connected near one end to the support apparatus and are connected near an opposite end to the platform. The support apparatus includes a bottom support frame. Preferably, two pairs of bottom straps have respective first ends thereof of each strap attached to the bottom frame. Each of a first pair of straps has a respective second end attached to a first outer end of a weighing platform or basket. The first ends are attached to a middle portion of the bottom frame at outer positions, spaced from a longitudinal center line of the weighing platform. The second ends are attached near the longitudinal center line, such that an X- or v-shaped configuration of the strap pair is formed, that is, the straps tend to intersect somewhere in space, if extended. The second pair of bottom straps is similarly configured, but in mirror image of the first pair. The bottom straps are preferably positioned to control movement in both longitudinal directions. For example, a cross-hatch configuration is envisioned, wherein two pairs of straps are provided for each end of the bottom frame. One pair is longitudinally positioned and each strap extends from the bottom frame to the basket first end. The other pair is laterally positioned, perpendicular to the first pair.

A first end of each second pair strap is attached to one of two opposed side portions of the bottom frame and are oppositely positioned relative to another. A second end of each second pair strap is attached to the basket, to opposite sides thereof from the respective side portion associated with the first end.

The weighing platform is supported by the scale mechanism and floats above the bottom frame, and does not normally contact the bottom frame during the weighing process. The straps are preferably long enough such that the slight vertical movement of the basket during weighing does not substantially change the angle of the straps with respect to the horizontal thereby not appreciably affecting the indicated weight. The straps are flexible vertically and generally resist tension forces horizontally. Where coacting pairs of straps are used in opposition to each other, the straps do not have to resist compression forces, but must do so if used only as a single pair.

It is contemplated that materials other than metal straps could be used, such as a substantially non-flexible rope. The rope is a prime example of a material that is resistant to tension but not compression. As dual pairs of these members are provided, they work with each other to inhibit movement in both directions along a longitudinal axis.

Preferably, two pairs of top flexible bands are also provided. They are substantially similar in configuration, and only one pair is discussed with an opposited pair being a mirror image of the first. One end of each band is pivotally connected to one end of the support apparatus, and the other end of each band is connected to one end of the weighing platform, preferably at the top of a weighing basket. The bands cross, and form an X-shaped configuration, and can flex upwardly and downwardly. These bands serve to inhibit lateral movement of the weighing platform or basket, in coordination with the bottom straps, which inhibit longitudinal movement. Again, these bands, when used in cooperating but counteracting pairs, need only be resistant to tension, and do not substantially affect the indicated weight if spacing resistance to vertical deflection thereof is properly chosen to be relatively low.

The drawings constitute a part of this specification and include exemplary embodiments of the present invention and illustrate various objects and features of the present invention.

DETAILED DESCRIPTION OF THE INVENTION

Figure 1:
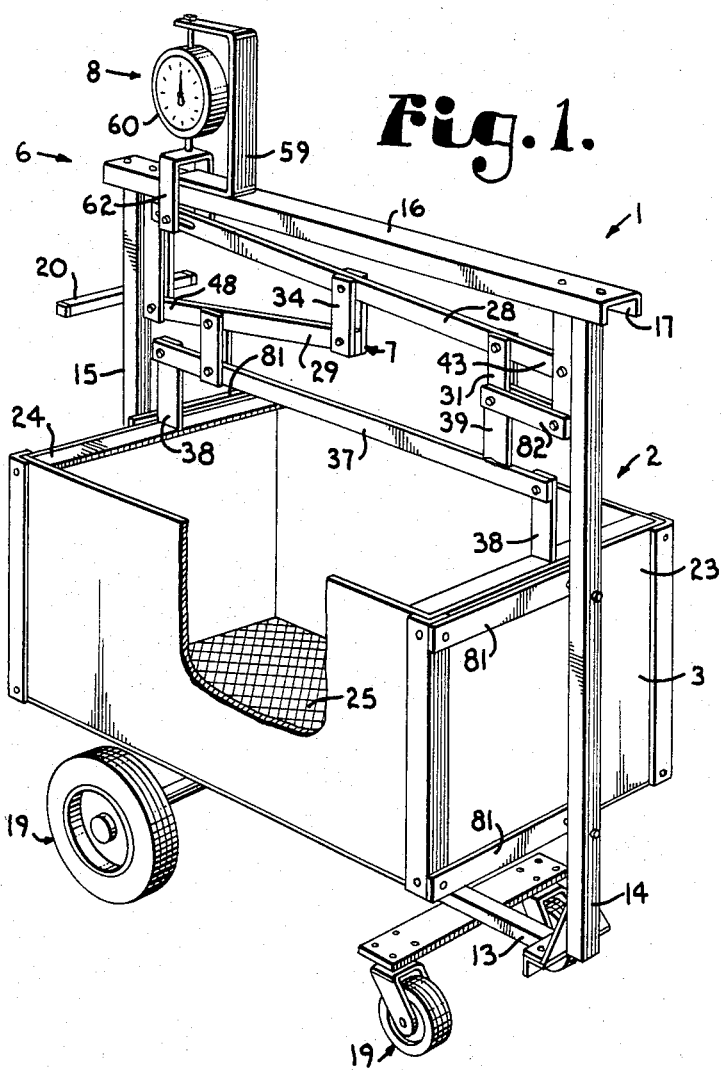
FIG. 1 is a perspective view of a livestock scale comprising a weighing platform and support apparatus embodying the present invention.
Figure 3:
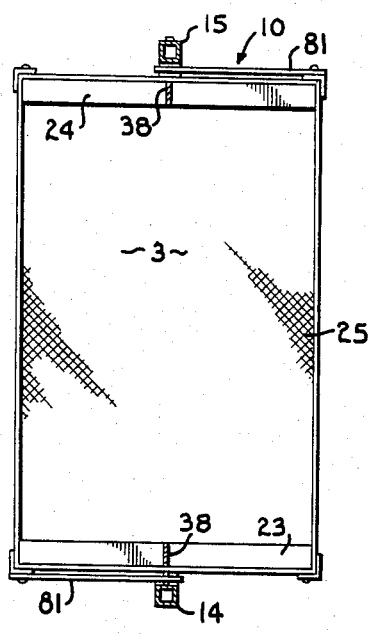
FIG. 3 is a top plan view of the livestock scale, with portions broken away.
Figure 2:
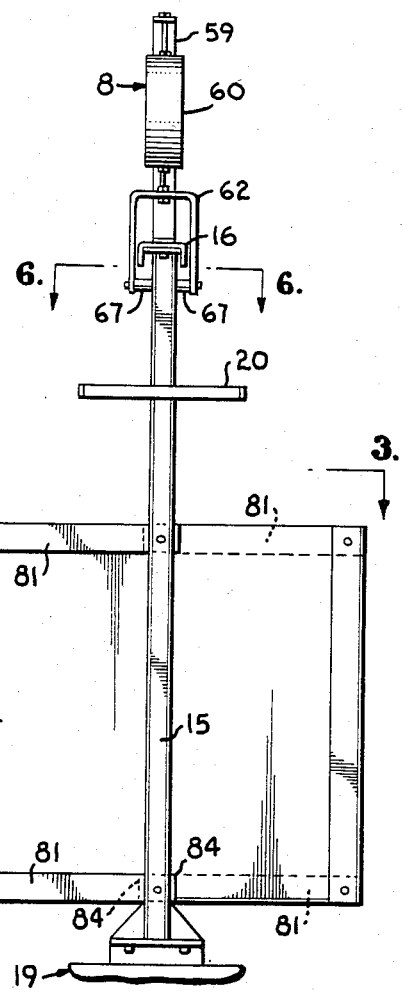
FIG. 2 is an front elevational view of the livestock scale with portions shown in phantom.

As required, detailed embodiments of the present invention are disclosed in the detailed description of the invention; however, it is to be understood that the disclosed embodiments are merely exemplary of the invention which may be embodied in various forms. Therefore, specific structural and functional details disclosed in the detailed description of the invention are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally indicates a livestock scale embodying the present invention. The livestock scale 1 comprises a support apparatus 2 and a weighing platform or basket 3 supported by the support apparatus 2. The weighing basket 3 receives a load, such as a live animal, which is not shown. A weighing mechanism 6 is included and comprises weight-transmitting means 7 and weight-indicating means 8. Linear restraint means 10 inhibit horizontal movement of the basket 3 relative to the support apparatus 2, particularly during vertical movement of the basket 3 relative to the support apparatus 2 during a weighing procedure.

Figure 4:
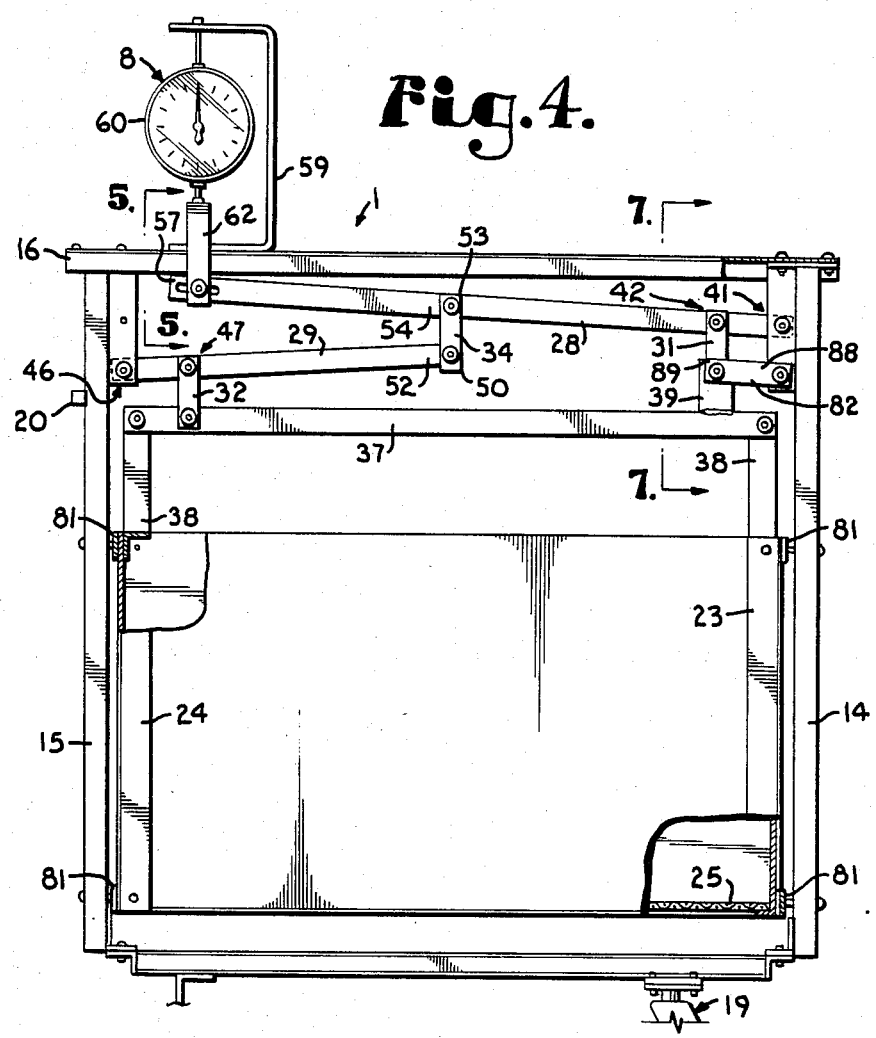
FIG. 4 is a side elevational view of the livestock scale with portions broken away to show interior detail.
Figure 5:
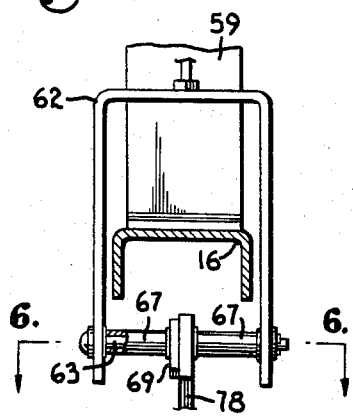
FIG. 5 is an enlarged, fragmentary cross-sectional view taken along line 5—5, FIG. 4.
Figure 6:
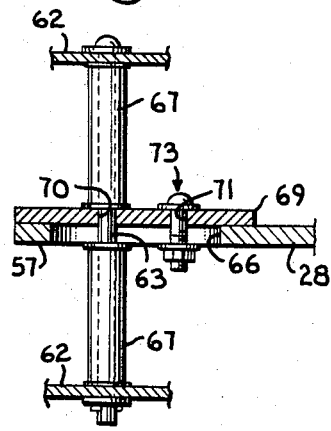
FIG. 6 is an enlarged, fragmentary cross-sectional view taken along line 6—6, FIG. 2.
Figure 7:
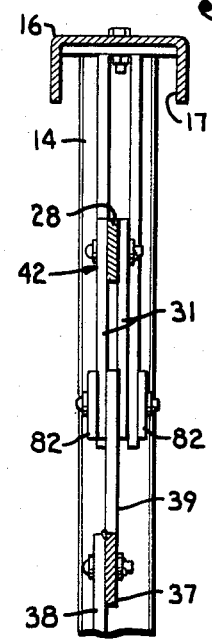
FIG. 7 is an enlarged, fragmentary cross-sectional view taken along line 7—7, FIG. 4.

It is noted that the term "longitudinal" as used herein refers generally to the side-to-side orientation of the apparatus 2 in a horizontal plane as seen in FIG. 4. Preferably, the weighing basket 3 is rectangular in shape, and the term "longitudinal" is also utilized to refer to the major horizontal axis of the basket 3. The term "lateral" refers to a direction or orientation generally perpendicular to longitudinal. It is emphasized that, although certain arrangements discussed herein refer to a longitudinal or lateral orientation, such references are not to be considered limiting. The terms "forward" and "backward" refer to lateral movement in directions into and out of the page respectively in FIG. 4.

In a first embodiment of the present invention, the support apparatus 2 is constructed from a bottom support beam 13 and first and second stanchions 14 and 15. A top support beam 16 having a channel 17 therein extends between top ends of the first and second stanchions 14 and 15, thereby forming a rigid frame for supporting the weighing basket 3.

As illustrated, the support apparatus 2 further includes a wheel assembly 19 and push handle 20, which allow the livestock scale 1 to be easily moved from one location to another. Although first and second stanchions 14 and 15 are illustrated, it is envisioned that the support apparatus 2 could include any suitable first and second end frames located at respective first and second ends of the support apparatus 2 for supporting the weighing basket 3.

The weighing basket 3 has a first end 23 positioned near the first stanchion 14, and a second end 24 positioned near the second stanchion 15. Further, the weighing basket 3 has a floor 25, which is preferably made from a mesh material which allows corrosive animal excretions to exit from the basket 3.

The weighing mechanism 6 includes the weight-transmitting means 7 and the weight-indicating means 8. The weight-transmitting means 7 comprises a number of elements, namely: a primary scale arm 28, a secondary scale arm 29, primary and secondary hanging links 31 and 32, and a connecting link 34. It is noted that, as illustrated, certain of the links and other pivotal connection members are formed of two pieces. However, when reference is made to such two-piece components, the reference will be to a single unit, for ease of description and it is foreseen that in fact the various components may be one-piece. Further, appropriate fasteners are used to assemble the livestock scale, particularly the weight-transmitting means 7.

The basket 3 includes a cross-brace 37 supported by uprights 38. The primary and secondary hanging links 31 and 32 are connected to the cross-brace 37. The secondary hanging link is pivotally connected to the brace 37, while the primary hanging link is pivotally connected to an extension member 39 that is attached, as by welding, to the cross-brace 37.

The primary scale arm 28 has a first location 41 and a second location 42, which are horizontally spaced from one another along the length of the primary scale arm 28. The primary scale arm 28 is pivotally connected to the first stanchion 14 at the first location 41, which preferably is at an outer end 43 of the primary scale arm 28.

The secondary scale arm 29 has a third location 46 and a fourth location 47 horizontally spaced along the length of the secondary scale arm 29. The secondary scale arm 29 is pivotally connected to the support apparatus 2 at the third location 46 along the secondary scale arm 29, which is preferably at an outer end 48 of the secondary scale arm 29.

The primary and secondary hanging links 31 and 32 are pivotally connected to their respective scale arms 28 and 29 at the second location 42 and fourth location 47 along the scale arms 28 and 29 respectively. Preferably, the second location 42 is horizontally spaced from the first location 41 a first distance that is equal to the horizontal spacing of the fourth location 47 from the third location 46. Thus, an equal pair of first lever arms are defined along the primary and secondary scale arms 28 and 29, which lever arms each act or exert on the weight-transmitting means 7 with substantially the same reaction force equal to a given weight or load supported by the primary and secondary scale arms 28 and 29 through their respective primary and secondary hanging links 31 and 32.

The connecting link 34 provides a pivotal connection between the primary scale arm 28 and the secondary scale arm 29. This connection is horizontally spaced from and positioned between the second and fourth locations 42 and 47. Preferably, one end 50 of the connecting link 34 is connected to an inner end 52 of the secondary scale arm 28. Another end 53 of the connecting link 34 is swingably connected to the primary scale arm 28 along a medial segment 54 thereof. As illustrated, the connecting link 34 is positioned equidistantly from the primary and secondary hanging links 31 and 32, thereby defining a second distance that the connecting link 34 is horizontally spaced from the first and third locations 41 and 46. Thus, a pair of second lever arms is present, through which a reaction force is transmitted by the primary and secondary scale arms 28 and 29 and realized at the medial segment 54, and involving the sum of both the force applied at the second location and the force applied at the fourth location.

As illustrated, the primary scale arm 28 is substantially longer than the secondary scale arm 29 and has a free end 57. The weight-indicating means 8 are connected to the weight-transmitting means 7 near the free end 57 of the primary scale arm 28. The force applied at the connecting link connection to the primary scale arm medial segment 54 is transmitted along the primary scale arm 28 to the weight-indicating means 8. Thus, a third lever arm is defined, namely the first location 41 to the location where the weight-indicating means are connected to the primary scale arm 28.

The weight-indicating means are connected to the top support beam 16 by a scale hanger 59, from which a spring scale 60, or like mechanism is suspended. A bracket or clevis 62 is connected to the primary scale arm free end 57 and includes a clevis pin 63 which extends through a calibration slot 66 in the primary scale arm 28. The clevis pin 63 extends through spacers 67, which maintain the primary scale arm 28 in a generally central position between the arms of the clevis 62.

A calibration tab 69 is used in connection with the calibration slot 66, which use is described below. The calibration tab 69 has a first aperture 70 through which the clevis pin 63 extends. The calibration tab 69 also has a second aperture 71 through which a bolt of a locking nut and bolt arrangement 73 extends, for locking the calibration tab 69 and clevis 62 in relation to the primary scale arm 28.

As illustrated in the first embodiment, particularly FIGS. 1 through 4, the linear restraint means 10 comprise a plurality of longitudinal sway bars 81 and a longitudinal sway link 82. In particular, two pairs of the lateral sway bars 81 are provided, one associated with either end of the weighing basket 3. Each sway bar 81 has one end 84 pivotally connected to the respective first or second stanchion 14 and 15 and another end 85 pivotally connected to the basket 3. The pair of sway bars 81 associated with the basket first end 23 extends in a forward lateral direction from the first stanchion 14 to the basket end 23, one of the pair being positioned near a top portion of the basket 3 and the other of the pair being positioned near a bottom portion. The other pair of sway bars 81 associated with the basket second end 24 extend from the second stanchion 15 to the basket second end 24 in a backward lateral direction, one being positioned near the top portion of the basket 3 and the other being positioned near the bottom portion. The sway bars 81 are generally horizontal in position, but may be aligned slightly out of horizontal. Further, both pairs of sway bars 81 may be positioned to extend in the same lateral direction. As illustrated, the first pair of sway bars 81 acts to inhibit horizontal movement of the basket in the forward lateral direction, while the other pair serves to limit horizontal movement of the basket in a backward lateral direction.

The longitudinal sway link 82 is connected at one end 88 to the support apparatus 2, such as the first stanchion 14, and at another end 89 to the primary hanging link 31 and extension member 39. The sway link 82 is positioned at the same angle relative to the horizontal as is the primary scale arm 28, thus forming a parallelogram configuration, as seen in FIG. 4. This parallelogram configuration assures that the weighing mechanism 6 can undergo vertical deflection during weighing, but also serves to limit the longitudinal horizontal movement of the weighing basket 3.

In use, a load, such as a litter of pigs, is placed in the weighing basket 3. This load is transferred through the weight-transmitting means 7 to the weight-indicating means 8 and a proportional weight is read from the scale 60. The basket 3 moves vertically with respect to the support apparatus 2 during this operation, thereby causing the weighing mechanism 6 to also move. Specifically, the primary and secondary scale arms 28 are caused to move downwardly, thereby exerting a force on the clevis 62 and scale 60. This force is directly proportional to the weight of the load and platform. As the primary and secondary scale arms 28 and 29 move, the angle that each forms with respect to a horizontal line changes, but in doing so the two angles change equally such that they are always equal to each other.

The calibration slot 66 and calibration tab 69 serve to allow fine adjustment of the weight-indicating means 8. The indicated weight is proportional to the weight of the load and the platform. This proportion is related to the ratio of the length of the first lever arm to the third lever arm. The first lever arm is related to the first distance, that is, between the first and second locations and the third and fourth locations. The third lever arm is equal to the second distance, that is between the first location and the connecting link, plus the distance between the connecting link 34 and the clevis pin 63.

By utilizing the calibration slot, this third distance may be adjusted to compensate for variations in the machining of the primary and secondary scale arms 28 and 29, so as to finely control the length of the third lever arm. To calibrate, the basket weight (tare weight) is indicated in negative terms on the scale, with nothing attached to it. Subsequently, the scale 60 is connected to the primary scale arm 28 by means of the clevis pin 63 and calibration slot 66. Once this connection is made, the scale should now read "0". If "0" is not indicated, the length of the third lever arm must be changed by moving the clevis pin 63 along the slot 66. When the scale indicates "0", the calibration tab 69 and locking bolt and nut arrangement 73 are used to lock the clevis pin in place along the slot 66. Because the apparent indicated weight of the empty basket 3 is indicated as "0" (as the operation was begun at a negative weight), subsequent loads will also be properly indicated as a net weight on the scale.

In the first embodiment, the lateral sway bars 81 and longitudinal sway bars 82 will serve to inhibit lateral and longitudinal horizontal movement of the basket when the load is being weighed. This is particularly important when live animals, such as pig litters, are being weighed. The basket 3 moves approximately one inch or less vertically during the weighing operation, such that the sway bars 81 and sway link 82 do not substantially interfere with the indicated weight.

An alternative embodiment of a livestock scale according to the present invention is shown in FIGS. 8 through 13 and numbered 1a. The scale 1a comprises a weighing mechanism 6a which is substantially similar to the mechanism 6 of the previous embodiment and similar parts of the two embodiments are numbered the same except for the addition of the letter "a" to the parts of the alternative embodiment. The arrangement of a support apparatus 2a and the weighing basket 3a is changed slightly to accommodate the alternative embodiment of the linear restraint means 10a, and also to allow the provision of movable gates at either end of the weighing basket 3a, not shown, to control ingress and egress of a livestock animal into and out of the basket 3a.

Figure 8:
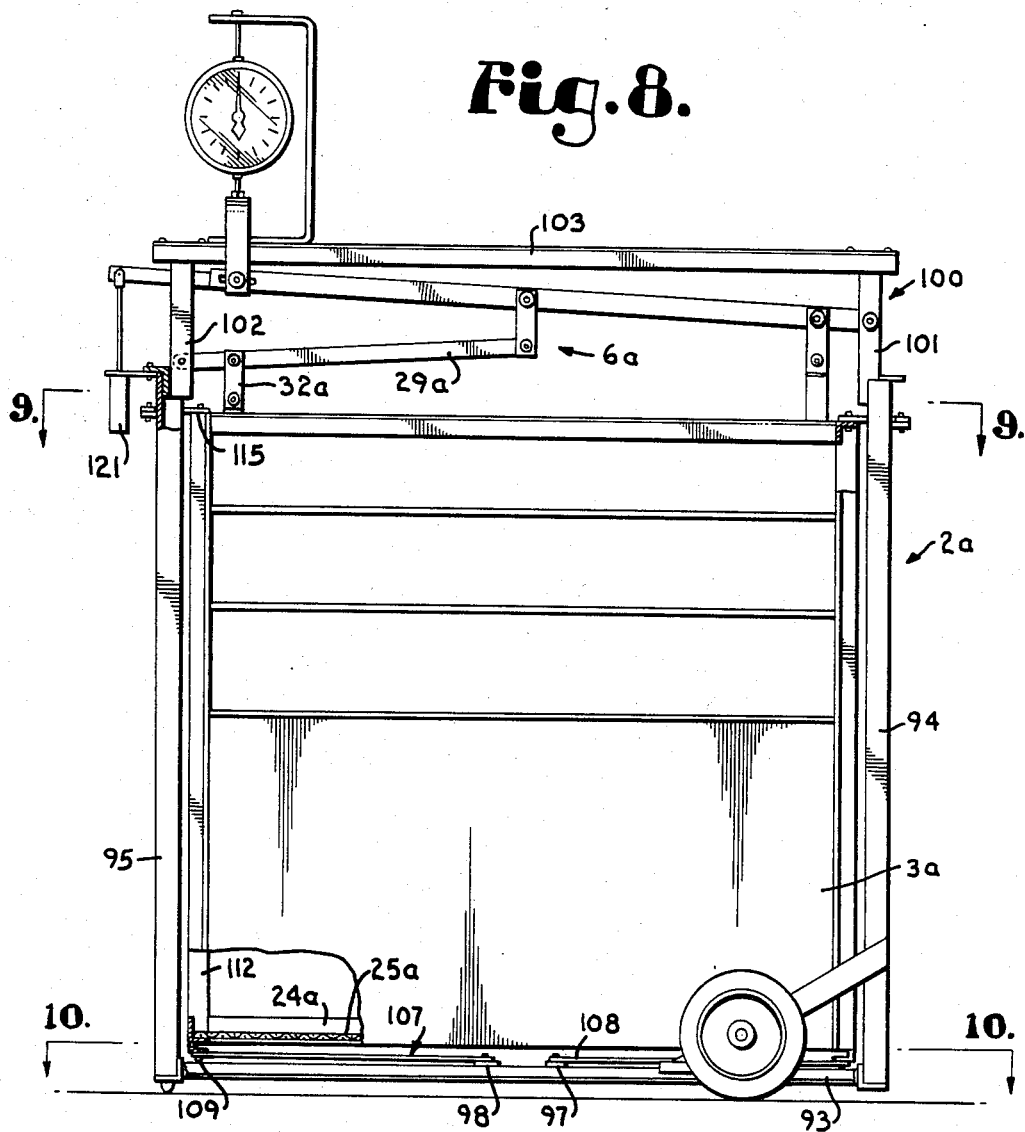
FIG. 8 is a side elevational view of a modified livestock scale according to the present invention, with portions broken away to show interior detail.
Figure 9:
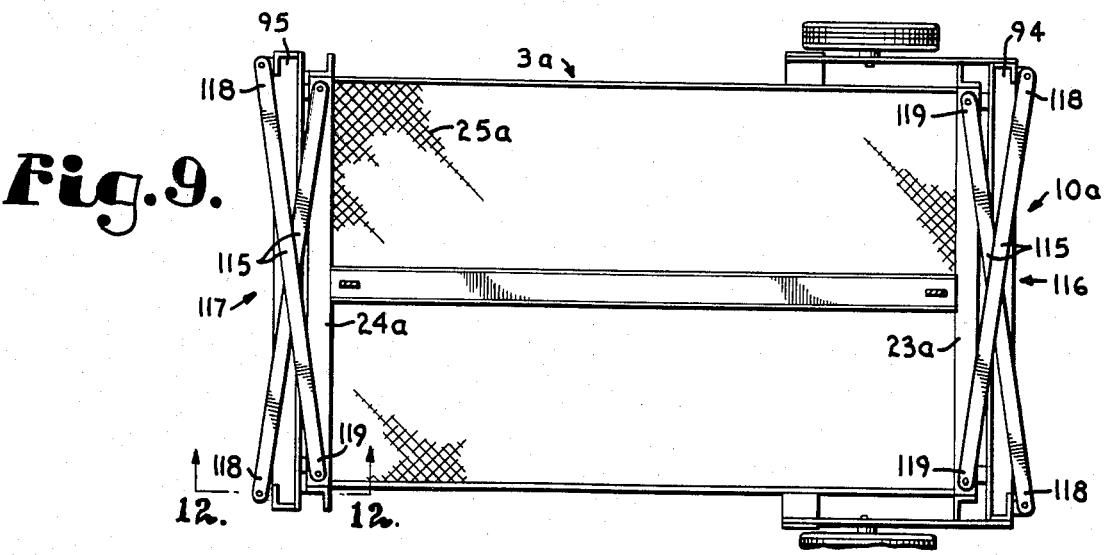
FIG. 9 is a cross-sectional view of the modified livestock scale taken along line 9—9, FIG. 8.
Figure 10:
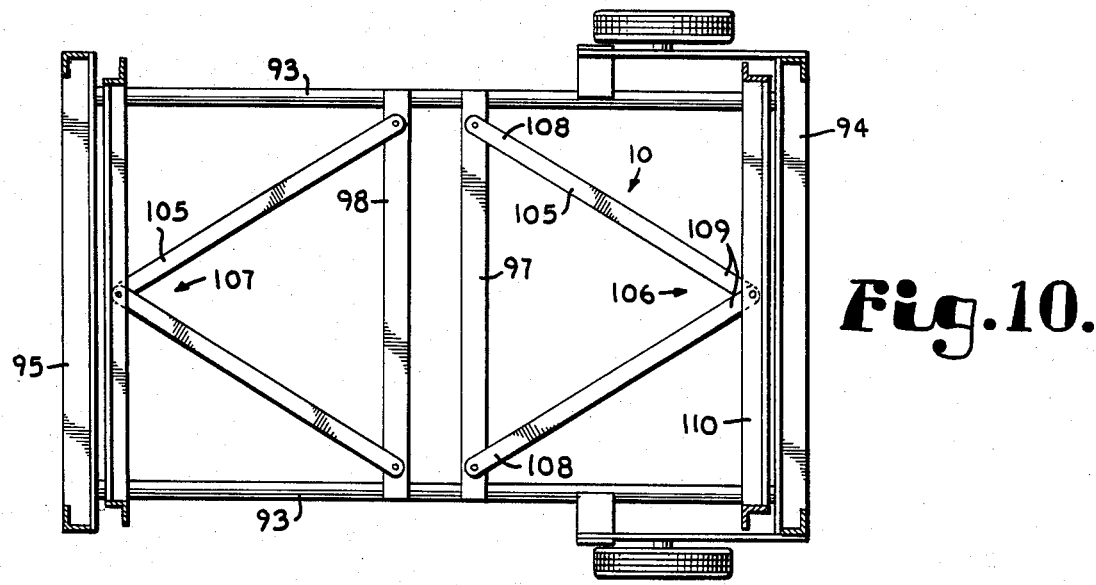
FIG. 10 is a cross-sectional view of the modified livestock scale taken along line 10—10, FIG. 8.
Figure 11:
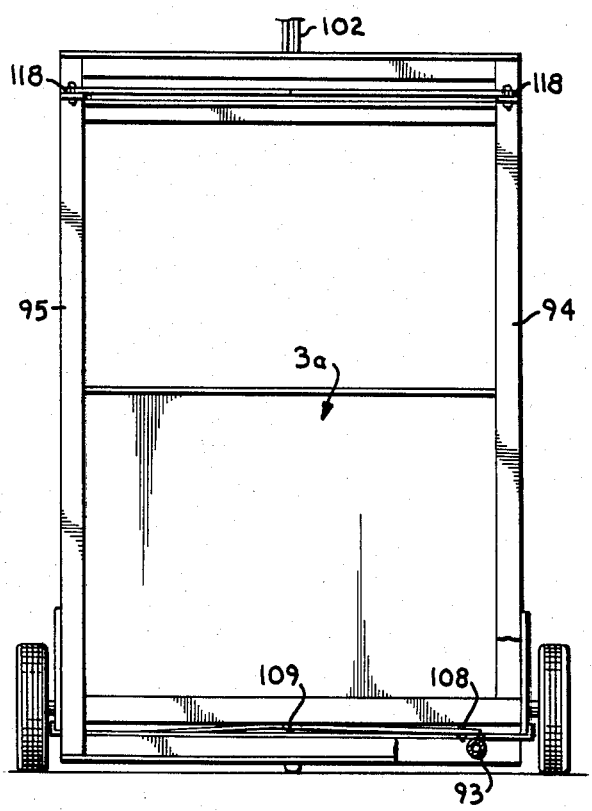
FIG. 11 is a fragmentary, front elevational view of the modified livestock scale, with portions broken away.
Figure 12:
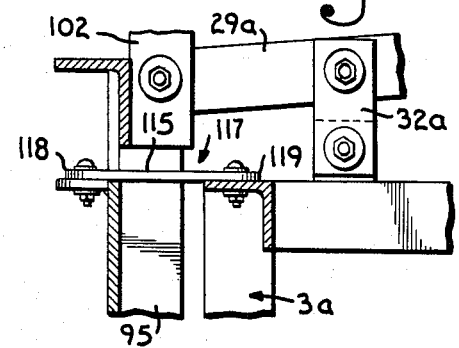
FIG. 12 is an enlarged, fragmentary cross-sectional view of the modified livestock scale taken along line 12—12, FIG. 9.
Figure 13:
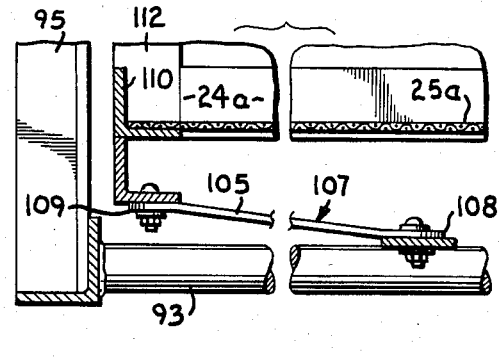
FIG. 13 is an enlarged, fragmentary view of the modified livestock scale showing bottom flexible restraint straps thereof at an exaggerated degree of inclination.

The support apparatus 2a, as best shown in FIGS. 8, 10 and 11, has a bottom support frame 93, a first end frame 94, and a second end frame 95. The bottom frame 93 has first and second lateral members 97 and 98 positioned toward the middle thereof.

The weighing mechanism 6a includes, in addition to the previously described elements, a scale support structure 100. This structure includes first and second posts 101 and 102 attached to and extending upwardly from the first and second end frames 94 and 95, respectively. A longitudinal cross-bar 103 extends between the first and second posts 101 and 102. The cross-bar 103 has a scale hanger 59a attached thereto.

The linear restraint means 10a comprise a plurality of bottom frame flexible restraints 105 such as first and second pairs of flexible restraining straps 106 and 107. The strap pairs 106 and 107 are substantially similar in construction and configuration. In the illustrated embodiment, the individual straps of the first pair 106 each have one end 108 attached to the first bottom lateral member 97 and another end 109 attached to an angle iron 110, which is attached to the weighing basket 3a. The angle iron 110 is attached to the basket 3a at a position below a basket floor 25a, as by bolting to lower extensions of corner members 112.

The first end 108 of the straps is attached near the outer extremes of the first lateral member 97, and the other ends 109 are attached to the angle iron 110 generally along a longitudinal center line of the bottom frame 93, thereby forming a V-shaped configuration. The second strap pair 107 has essentially the same V-shaped configuration, but differs in that the first ends 108 are attached to the second bottom lateral member 98, and the other ends 109 are attached to the angle iron 110 of the weighing basket second end 24.

The linear restraint means 10a further include a plurality of top flexible restraints 115. The top flexible restraints 115 are formed into first and second pairs of flexible restraining bands 116 and 117. A first end 118 of each band is attached to a respective end frame 94, 95, preferably near a top portion thereof. A second end 119 of each top 115 restraint is attached to a respective weighing basket end 23, 24, preferably near a top portion thereof. Each individual restraint 115 extends from one outer extremity of the end frames 94 and 95 to an opposite outer extremity of weighing basket ends 23a and 24a respectively, such that the first and second pairs of restraining bands form respective X-shaped configurations.

The scale 1a also includes viscous damping means, such as a dampener 121 which is attached to the primary scale arm free end 57a.

In use, the alternative embodiment scale 1a is similar to the previous embodiment scale 1. However, the basket 3a is preferably always out of contact with the bottom support frame 93. The bottom flexible restraints 105 are preferably always in tension, and are resistant to tension, and serve to inhibit longitudinal horizontal movement in both directions. Again, because of the limited relative movement of the basket 3a during the weighing operation and the relative long length of the straps 106 and 107, the action of the restraints 105 has relatively little effect on the indicated weight.

Although it is foreseen that the bottom flexible restraints 105 may be utilized to limit lateral horizontal movement, the top flexible restraints 115 are also desirable, as the top restraints 115 further inhibit the basket 3a from moving laterally. Again, the top restraints 115 or bands 116 and 117 are in tension and need only be resistant to tension when used in pairs, not compression.

It is to be understood that while certain forms of the present invention have been illustrated and described herein, it is not to be limited to the specific forms or arrangement of parts described and shown.

What is claimed and desired to be secured by Letters Patent is as follows:

1. A livestock scale comprising:
   (a) a weighing platform for receiving a load to be weighed:
   (b) a support apparatus supporting said platform such that said platform is vertically movable relative to said support apparatus;
   (c) a weighing mechanism cooperating with said platform for indicating the weight of a load received on said platform;
   (d) said weighing mechanism including weight-transmitting means and weight-indicating means; and
   (e) said weight-transmitting means comprising:
      (1) a primary scale arm having first and second horizontally spaced locations therealong and being pivotally connected at said first location to said support apparatus;
      (2) a secondary scale arm having third and fourth horizontally spaced locations therealong and being pivotally connected at said third location to said support apparatus; said first location being horizontally spaced from said third location;
      (3) a primary hanging link being pivotally connected near one end thereof to said primary scale arm at said second location therealong; said primary hanging link being connected near another end thereof to said platform;
      (4) a secondary hanging link being pivotally connected near one end thereof to said secondary scale arm at said fourth location therealong; said secondary hanging link being connected near another end thereof to said platform; said primary and secondary links being connected to said platform in horizontally spaced relationship relative to each other;
      (5) a connecting link pivotally connecting said secondary scale arm and said primary scale arm, and being horizontally spaced from and positioned between said second and fourth locations; and
      (6) said weight-indicating means being supported by said support apparatus and connected to said primary scale arm at a position therealong for indicating a weight in predetermined proportion to the weight of the load; such that a reaction force proportional to the weight being transferred to said weight-indicating means is transmitted through said primary and secondary hanging links and said connecting link to said secondary and primary scale arms, whereby the weight of the load is proportionally indicated by said weight-indicating means.

2. The livestock scale as set forth in claim 1 including:
   (a) restraint means comprising a linear restraint member connecting said support apparatus and said platform so as to substantially restrain horizontal movement of said platform while allowing generally unrestricted vertical deflection of said platform relative to said supporting apparatus.

3. The scale as set forth in claim 2 wherein:
   (a) said linear restraint member comprises:
      (1) a lateral sway bar pivotally connected near one end to said support apparatus and near another end to said platform; said sway bar limiting lateral horizontal movement of said platform as said platform undergoes vertical deflection; and said restraint means further include:
      (2) a sway link pivotally connecting said support apparatus and said platform, and limiting longitudinal horizontal movement of said platform as said platform undergoes vertical deflection during weighing.

4. The scale as set forth in claim 3 wherein:
   (a) said sway link is pivotally connected at one to said support apparatus and at another end to said primary hanging link in generally parallel relation to said primary scale arm, and forming a parallelogram configuration with said primary scale arm, said primary hanging link and said support apparatus.

5. The livestock scale as set forth in claim 2 wherein:
   (a) said restraint means comprises:
      (1) a pair of flexible restraints each connected near one end thereof to said platform and near another end thereof to said support apparatus, whereby lateral and longitudinal horizontal movement of said platform is limited as said platform undergoes vertical movement when a load is placed thereon.

6. The livestock scale as set forth in claim 1 wherein:
   (a) for a given load on said platform, a first angle is formed between said primary scale arm and an imaginary horizontal line passing through the connection of said primary scale arm to said support apparatus;
   (b) for said given load on said platform, a second angle is formed between said secondary scale arm and an imaginary horizontal line passing through the connection of said secondary sale arm to said support apparatus; and
   (c) for said given load on said platform, said first and second angles are equal during a weighing operation.

7. The livestock scale as set forth in claim 1 wherein:
   (a) said second location is horizontally spaced a first distance from said first location; and
   (b) said fourth location is spaced a distance equal to said first distance from said third location.

8. The livestock scale as set forth in claim 7 wherein:
   (a) said connecting link is connected to said primary scale arm a second horizontal distance from said first location; and
   (b) said connecting link is connected to said secondary scale arm a horizontal distance equal to said second distance from said second location.

9. The livestock scale as set forth in claim 1 wherein:
   (a) said primary scale arm inclrdes a calibration slot therein which extends along a portion thereof generally corresponding to the position at which said weight-indicating means is connected to said primary scale arm;
   (b) said weight-indicating means includes a slot-engagement member which extends through said calibration slot and is positionable therealong; and wherein:
   (c) weight indication by said weight-indicating means is modified by the displacement of said slot-engagement member along said primary scale arm such that an indicated weight displayed by said weight-indicating means is calibratable to be substantially proportional by a preselected ratio to a true weight carried by said weight-transmitting means.

10. A scale comprising:
(a) a support apparatus;
(b) a weighing platform for receiving a load to be weighed and being supported by said support apparatus so as to allow vertical deflection of said platform;
(c) weight-indicating means being operatively connected to said platform and supported by said support apparatus;
(d) weight-transmitting means connecting said platform and said weight-indicating means and transmitting a reaction force proportional to the weight of the load carried by said platform to said weight-indicating means; said weight-transmitting means including a primary scale arm and a secondary scale arm; said primary and secondary scale arms each being pivotally connected near respective horizontally spaced apart first ends thereof to said support apparatus and pivotally connected to said platform by respective primary and secondary hanging links, said primary and secondary scale arms being interconnected by a connecting link;
(e) restraint means comprising a linear restraint member for restraining horizontal movement of said platform; said restraint member connecting said platform and said support apparatus so as to allow vertical deflection of said platform relative to said support apparatus and so as to restrain horizontal movement of said platform relative to said support apparatus upon vertical deflection of said platform upon loading thereof; said linear restraint member comprising: a lateral sway bar pivotally connected near one end to said platform and near another end to said support apparatus and adapted to inhibit lateral horizontal movement in a first direction; and
(f) said restraint means further comprising a sway link pivotally connected near one end thereof to said support apparatus and near another end thereof to said primary hanging link between said primary scale arm and said platform, whereby longitudinal and lateral horizontal movement of said platform is inhibited while said platform undergoes vertical deflection upon receiving a load to be weighed.

11. The scale as set forth in claim 10 wherein:
(a) said sway link is positioned in generally parallel relation to said primary scale arm and generally forms a parallelogram configuration with said primary scale arm, said primary hanging link and a portion of said support apparatus between said primary scale arm and said sway link.

12. A livestock scale comprising:
(a) a weighing platform for receiving a load to be weighed;
(b) a support apparatus supporting said platform such that said platform is vertically movable relative to said support apparatus;
(c) a weighing mechanism for indicating the weight of a load received on said platform; said weighing mechanism including weight-transmitting means and a weight-indicating means;
(d) said weight-transmitting means comprising:
 (1) a primary scale arm having an outer end, a first location near said outer end, a second horizontally spaced location therealong, a medial segment, and a free end; said primary scale arm being pivotally connected to said support apparatus at said first location;
 (2) a secondary scale arm having an outer end, a third location near said outer end, a fourth location horizontally spaced from said third location, and an inner end; said secondary scale arm being pivotally connected to said support apparatus at said third location;
 (3) a primary hanging link being pivotally connected near one end thereof to said primary scale arm at said second location therealong; said primary hanging link being connected near another end thereof to said platform;
 (4) a secondary hanging link being pivotally connected near one end thereof to said secondary scale arm at said fourth location therealong; said secondary hanging link being connected near another end thereof to said platform; said primary and secondary links being connected to said platform in horizontally spaced relationship relative to each other;
 (5) a connecting link pivotally connecting said secondary scale arm and said primary scale arm, and being horizontally spaced from and positioned equidistantly between said second and fourth locations; and
 (6) said weight-indicating means being supported by said support apparatus and connected to said primary scale arm at a position therealong for indicating a weight in predetermined proportion to the weight of the load; such that a reaction force proportional to the weight being transferred to said weight-indicating means is transmitted through said primary and secondary hanging links and said connecting link to said secondary and primary scale arms, whereby the weight of the load is proportionally indicated by said weight-indicating means.

13. A livestock scale comprising:
(a) a support apparatus having a bottom frame with a first end and a second end, and including upwardly extending first and second end frames attached to said first and second bottom frame ends, respectively;
(b) a weighing basket being adapted to receive an animal to be weighed; said basket being supported by said support apparatus and having a first end, a second end and a floor; and
(c) a weighing mechanism comprising:
 (1) a scale support structure having a first post and a second post being attached to and extending upwardly from said first and second end frames, respectively, and including a longitudinal crossbar extending between said first and second posts;
 (2) a primary scale arm having an outer end, a medial segment, and a free end; said primary scale arm outer end being swingably connected to said first post;
 (3) a secondary scale arm having an outer end and an inner end; said secondary scale arm outer end being swingably connected to said second post;
 (4) a primary hanging link, a secondary hanging link, and a connecting link; said primary hanging link being attached at one end to said weighing basket near said first end thereof and being swingably connected at another end to said primary scale arm near said outer end thereof and spaced a first horizontal distance from said primary scale arm outer end; said secondary hanging link being connected at one end to said weighing basket near said second end thereof and being pivotally connected at another end to said secondary scale arm near said outer end thereof and being spaced said first horizontal distance from said secondary scale arm outer end; said connecting link being swingably connected near one end to said secondary scale arm near said inner end thereof and being swingably connected near another end to said secondary scale arm along said medial segment; and said connecting link being spaced from said secondary scale arm outer end a second horizontal distance and being spaced from said primary scale arm outer end said second distance;

(5) weight-indicating means being connected to said cross-bar near said second post and having a bracket extending below said cross-bar and being connected to said primary scale arm free end; and (6) said primary scale arm having a calibration slot therein near said free end thereof; said bracket having a slot-engagement member extending through said slot and including means for releasably retaining said bracket relative to said primary scale arm; said weight-indicating means indicating a weight generally proportional to the weight of the animal to be weighed and being adjustable relative to said primary scale arm by movement of said bracket along said calibration slot, whereby an indicated weight is substantially proportional to the weight of the animal.

14. The scale as set forth in claim 13 including:

(a) a plurality of bottom frame flexible restraints comprising first and second pairs of flexible restraining straps; each of said bottom straps being connected at one end to said bottom frame near a central portion thereof and oppositely spaced from a longitudinal center line of said bottom frame; said first pair of bottom straps each being connected at another end to said basket first end and generally along a longitudinal center line of said basket, and said second pair of bottom straps each being connected at another end to said basket second end and generally along said basket longitudinal center line thereby forming a V-shaped configuration; and (b) a plurality of top flexible restraints comprising first and second pairs of flexible restraining bands; each of said first and second top bands being connected near one end to top portion of said first and second end frames, respectively, and near another end to top portions of said basket first and second ends, respectively, so as to form respective first and second X-shaped configurations;

(c) whereby, upon vertical deflection of said basket relative to said support apparatus upon placement of an animal therein, said bottom frame flexible restraints and said top flexible restraints act to inhibit horizontal movement of said basket relative to said support apparatus without substantially restricting vertical movement.

* * * * *